(12) United States Patent
Wittenbreder, Jr.

(10) Patent No.: US 11,626,795 B2
(45) Date of Patent: Apr. 11, 2023

(54) HIGH EFFICIENCY POWER FACTOR CORRECTED POWER CONVERTERS

(71) Applicant: Ernest Henry Wittenbreder, Jr., Saint Petersburg, FL (US)

(72) Inventor: Ernest Henry Wittenbreder, Jr., Saint Petersburg, FL (US)

( * ) Notice: Subject to any disclaimer, the term of this patent is extended or adjusted under 35 U.S.C. 154(b) by 0 days.

(21) Appl. No.: 17/248,618

(22) Filed: Jan. 30, 2021

(65) Prior Publication Data

US 2022/0345032 A1   Oct. 27, 2022

(51) Int. Cl.
| | |
|---|---|
| *H02M 1/42* | (2007.01) |
| *H02M 7/04* | (2006.01) |
| *H02M 1/00* | (2006.01) |

(52) U.S. Cl.
CPC ......... *H02M 1/4225* (2013.01); *H02M 1/007* (2021.05); *H02M 1/0067* (2021.05); *H02M 1/0095* (2021.05); *H02M 1/4258* (2013.01); *H02M 7/05* (2021.05)

(58) Field of Classification Search
CPC .... H02M 1/42; H02M 1/4208; H02M 1/4233; H02M 1/4258; H02M 1/4225; H02M 1/4275; H02M 1/4291; H02M 1/0067; H02M 1/007; H02M 1/0083; H02M 1/0093; H02M 1/0095
See application file for complete search history.

(56) References Cited

U.S. PATENT DOCUMENTS

| | | | |
|---|---|---|---|
| 9,257,864 B2 * | 2/2016 | Pahlevaninezhad | ...... H02J 7/02 |
| 9,325,249 B2 * | 4/2016 | Bucheru | ............. H02M 3/3372 |
| 11,228,249 B2 * | 1/2022 | Deboy | ............. H02M 3/33573 |
| 2020/0195035 A1 * | 6/2020 | Cheong | ................. H02J 7/0029 |
| 2022/0149744 A1 * | 5/2022 | Huber | ..................... H03M 3/39 |

* cited by examiner

*Primary Examiner* — Gary L Laxton

(57) ABSTRACT

The subject invention reveals new methods and structures for achieving single stage power conversion with both regulated input current and regulated output voltage processing a minimum of load power and thereby achieving higher efficiency than other singles stage power converters with both regulated input current and regulated output voltage and two stage power factor corrected power converters. The subject invention reveals power factor corrected converters that improve the efficiency of the single stage power factor corrected converters on which they are based by adding an auxiliary converter that processes a small fraction of the total load power.

8 Claims, 11 Drawing Sheets

HIGH EFFICIENCY POWER FACTOR CORRECTED POWER CONVERTERS

CROSS REFERENCE TO RELATED APPLICATION

This application claims the benefit of PPA Ser. No. 61934949, filed 30 Jan. 2020 by the present inventor.

BACKGROUND OF THE INVENTION

Field of the Invention

The subject invention generally pertains to electronic power conversion circuits, and, more specifically, to high frequency, switched mode electronic power converters. The subject matter relates to new circuits and techniques for achieving higher efficiency in power factor corrected power converters compared to prior art power converters.

Description of Related Art

The solution to the problem of achieving high power factor in ac input power converters as well as high load regulation has typically relied on processing the power twice. FIGS. 1(A) and 1(B) Illustrate a common approach to the problem of achieving high power factor and tight load voltage regulation. The FIGS. 1(A) and 1(B) illustrate two stage power converters in which the first stage achieves high power factor correction (PFC) by controlling the input current and the second stage achieves isolation and well regulated output voltage. In the two stage converter the first stage is usually a boost converter that accomplishes PFC, but the output voltage of the boost stage has a high rectified line frequency ripple voltage component. For a 60 Hz mains the ripple voltage at the output of the boost converter has a 120 HZ component that is typically on the order of 10% of the output dc voltage component. For universal input power converters the dc output voltage of the boost converter may be ~400 volts and there would typically be a ~40 volt peak to peak 120 Hz ac component superimposed on the 400 volt dc component so that the output of the boost PFC pre-regulator would have an output voltage that varies between 380 volts and 420 volts at maximum load. At loads lighter than the maximum load the boost output voltage ac component would be smaller in proportion to the load power. The second power converters in FIGS. 1(A) and 1(B) are forward converter post regulators that provide a fixed output voltage and isolation. The power converter systems of FIGS. 1(A) and 1(B) process all of the power twice. Both stages provide power losses that reduce the efficiency of the system. The efficiency of the system depends on the efficiency of each stage and the amount of power that each stage processes. Since each conversion stage of the FIG. 1(A) and FIG. 1(B) circuits process all of the load power the total efficiency of the system is the product of the efficiencies of each stage. For example, if the efficiency of the boost converter is 95% and the efficiency of the forward converter is 90% then the efficiency of the system is 85.5% or 90% times 95%. If the forward converter could provide output regulation and process only half the power the efficiency of the system would be closer to 90%. What is needed is a power conversion system that does not need to process all the load power twice in order to achieve both regulated input current and regulated output voltage.

FIGS. 2(A) and 2(B) illustrate a more efficient system that achieves both regulated line current and load voltage. The system of FIGS. 2(A) and 2(B) uses a single stage PFC circuit that processes all of the power and provides that power to a large bulk capacitor at the output. The first stage provides a loose voltage regulation of the bulk capacitor voltage at about 95% of the target load voltage. Because the first stage provides only loose regulation the voltage of the bulk capacitor will vary between about 90% of the load voltage and 100% of the load voltage. A second power conversion stage, an auxiliary converter powered from the large bulk capacitor, provides a lower voltage in series with the bulk capacitor to an auxiliary capacitor that is much smaller in value and size than the bulk capacitor. The auxiliary converter provides on average about 5% of the load power. The peak power from the auxiliary converter is about 10% of the load power. The auxiliary converter is effectively in series with the load so the current in the auxiliary converter is equal to the load current and the power contributed to the load by the auxiliary converter is equal to the product of the load current and the output voltage of the auxiliary converter, which is equal to the auxiliary capacitor voltage. If the first stage provides an efficiency of 92% and the auxiliary converter provides an efficiency of 90% then the efficiency of the system is about 91%. Since the auxiliary converter only processes 10% of the total power it only contributes 1% of total power to the system losses. Shortcomings of the circuit of FIGS. 2(A) and 2(B) may be that the bulk capacitor is a relatively low voltage and the available capacitors do not have the energy storage density of the typically 450 volt bulk capacitor of the circuit of FIGS. 1(A) and 1(B). Also, in the circuit of FIGS. 1(A) and 1(B) the peak power processed is twice the load power in the boost pre-regulator but equal to the load power in the forward post-regulator, whereas in the single stage PFC converter of FIGS. 2(A) and 2(B) the peak power is twice the load power in both primary and secondary circuits.

What is needed is a power conversion system that processes the power less, confines the portion of the circuit that must handle peak power equal to twice the load power to a minimum, and can use circuit topologies that achieve the highest efficiencies.

Objects and Advantages

An object of the subject invention is to reveal a power conversion system for achieving PFC and tightly regulated load voltage with less power processing.

Another object of the subject invention is to reveal a power conversion system with higher efficiency than the prior art.

Another object of the subject invention is to reveal a power conversion system that minimizes the portion of the system that must handle peak power equal to twice the load power.

Another object of the subject invention is to reveal a power conversion system that can achieve lower size, lower cost, and higher power density.

Another object of the subject invention is to reveal a power conversion system that reduces the percentage of power processed as the load power is decreased.

Further objects and advantages of my invention will become apparent from a consideration of the drawings and ensuing description.

These and other objects of the invention are provided by novel circuits and techniques that enable precise control of both line current and load voltage using a minimum of power processing. Other novel circuits and techniques enable the realization of minimal power processing and maximum efficiency over the load power range.

SUMMARY

The subject invention reveals new circuits and techniques for achieving very high efficiency by processing a smaller percentage of the total load power and precisely controlling both line current and output voltage. The subject invention also reveals methods for reducing the percentage of power processed as the load voltage is decreased.

DESCRIPTION OF THE PREFERRED EMBODIMENTS

Figure 1A:
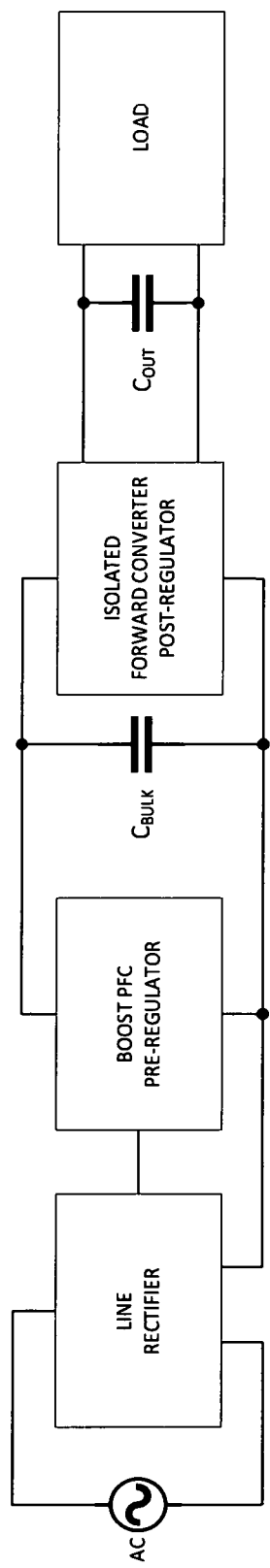
FIG. 1(A) illustrates a cascade two stage PFC power converter block diagram according to the prior art.
Figure 1B:
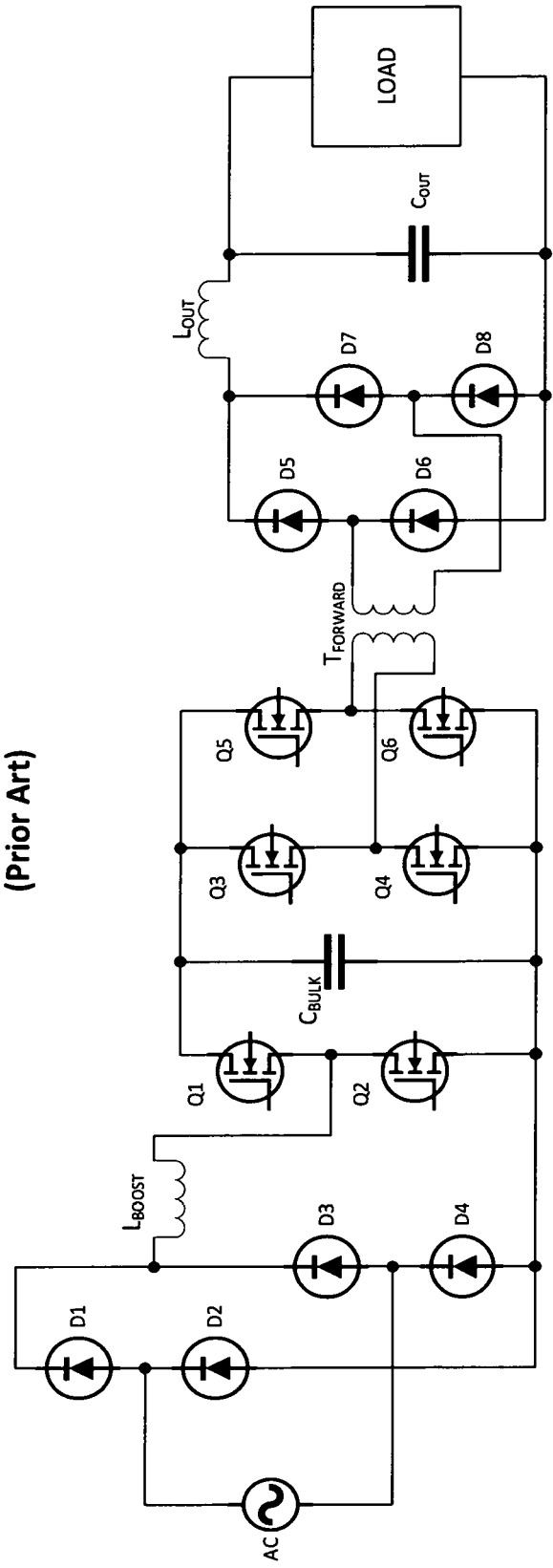
FIG. 1(B) illustrates a circuit example consistent with the block diagram of FIG. 1(A) according to the prior art.
Figure 2A:
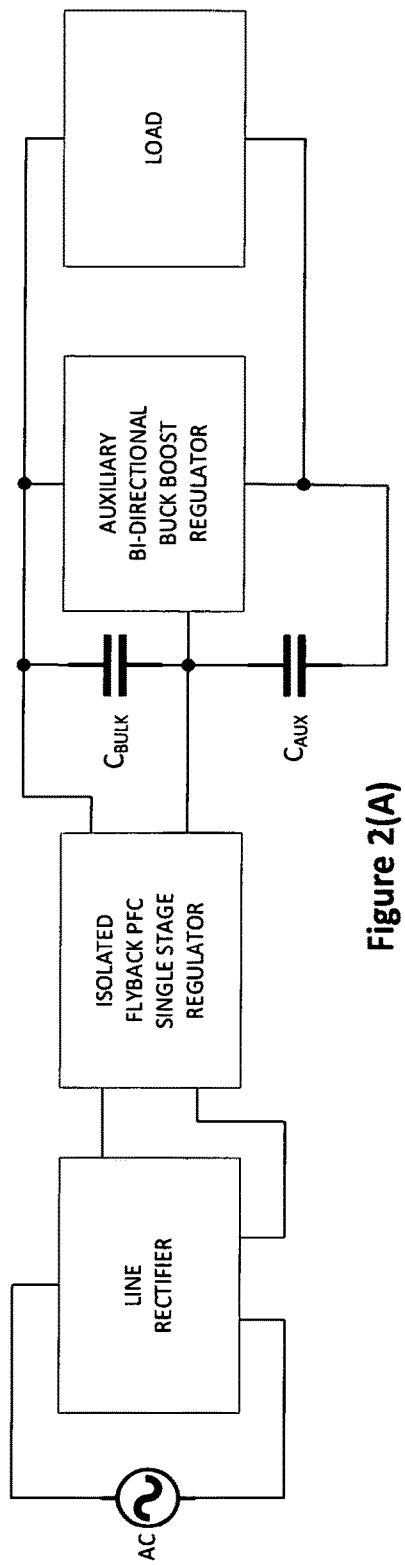
FIG. 2(A) illustrates a block diagram of a prior art PFC converter with reduced power processing.
Figure 2B:
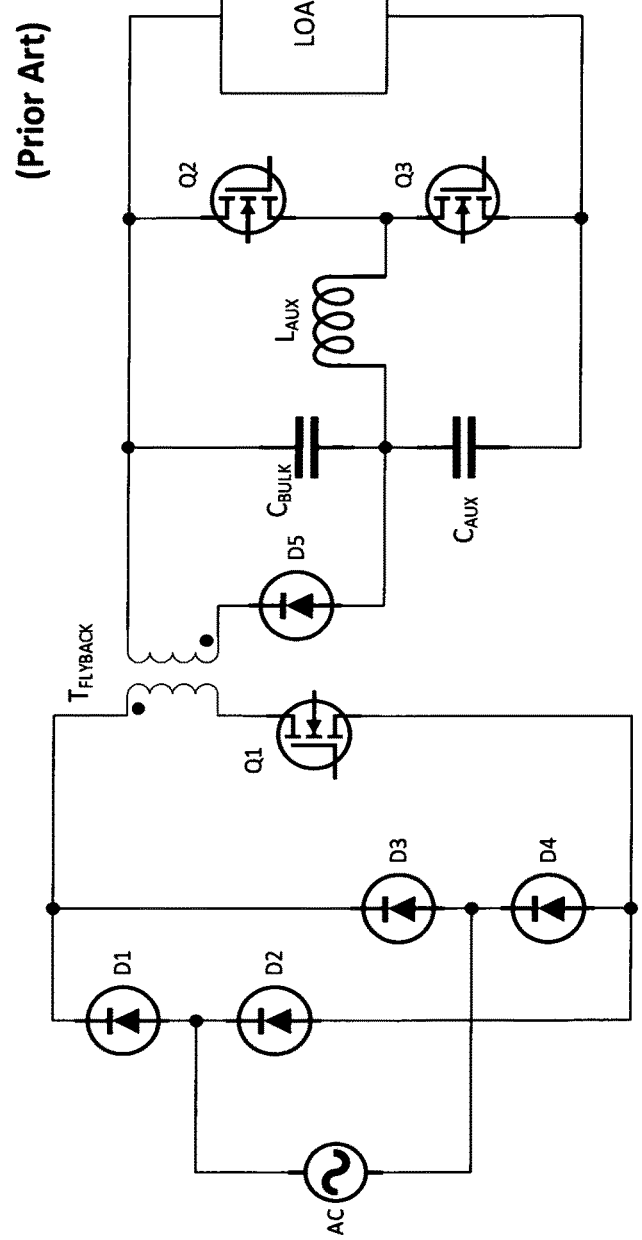
FIG. 2(B) illustrates a circuit example with fewer power processing stages consistent with the block diagram of FIG. 2(A) according to the prior art.
Figure 3:
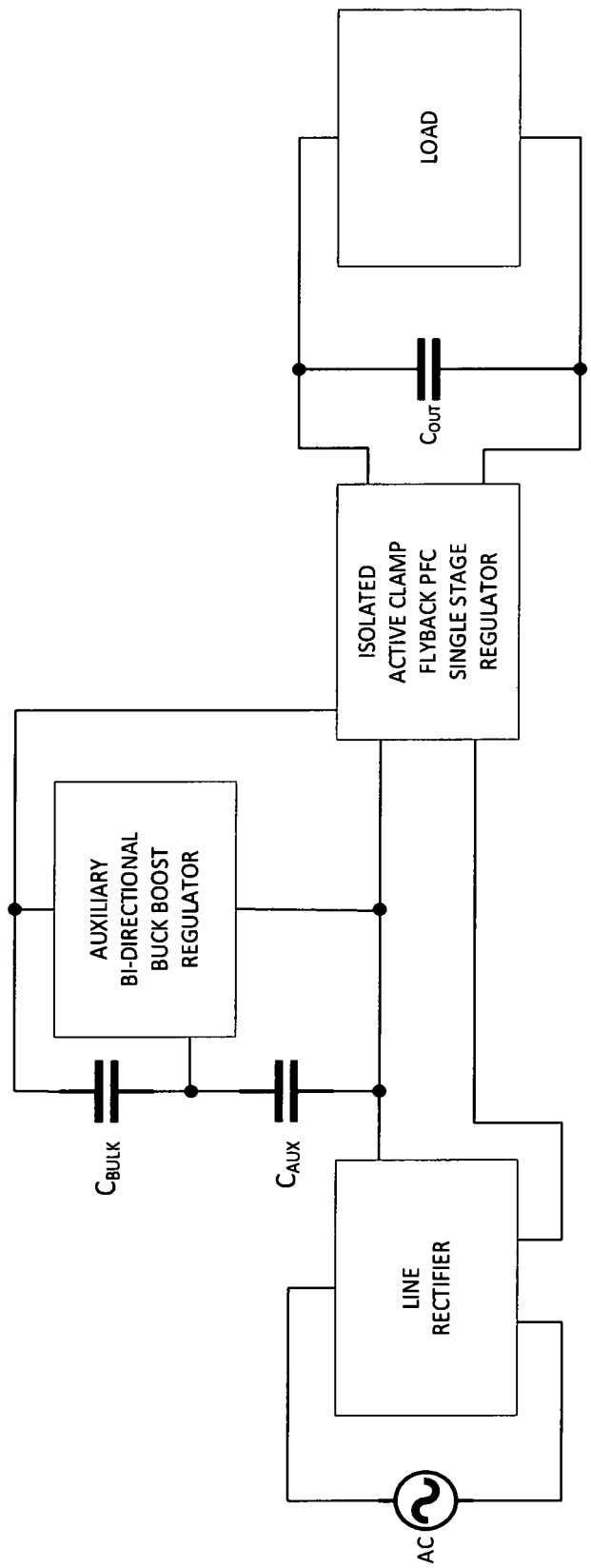
FIG. 3 illustrates a PFC power converter comprising a single stage isolated PFC converter and an auxiliary converter with reduced power processing according to the subject invention.

A preferred embodiment of the subject invention is illustrated in FIG. 3. FIG. 3 illustrates a block diagram of a system for precise control of both line current and load voltage by processing a minimum amount of load power. The system comprises a first power subconverter which is a single stage isolated PFC converter, which will also be referred to as a main converter. The main converter accepts power from an input which is derived from an ac voltage that has been rectified and delivers power to an output that can be coupled to a load. The system further comprises a second power subconverter, or auxiliary converter, that is connected to a primary voltage node and to a terminal of the input. The primary voltage node is internal to the main converter. The auxiliary converter is used to control a voltage of a series capacitor network which voltage indirectly affects the output voltage of the main converter. The series capacitor network comprises a series combination of a bulk energy storage capacitor, or bulk capacitor, which has a large energy storage capacity, and a smaller first auxiliary capacitor which has energy storage capacity, size, and capacitance much smaller than the bulk capacitor. The auxiliary converter transfers energy to and from the bulk capacitor and auxiliary capacitor. The auxiliary converter has bi-directional power conversion capability. When the output voltage of the main converter is lower than the target voltage the auxiliary converter responds by transferring charge from the bulk capacitor to the auxiliary capacitor thereby increasing the voltage of the auxiliary capacitor, decreasing the voltage of the bulk capacitor, increasing the voltage of the series capacitor network and the internal primary voltage node, and increasing the output voltage of the main converter. Since the bulk capacitor is larger and stores more energy than the auxiliary capacitor the decrease in voltage of the bulk capacitor is less than the increase in voltage of the auxiliary capacitor. Alternatively, if the output voltage is higher than the target voltage then the auxiliary converter responds by transferring charge from the auxiliary capacitor to the bulk capacitor thereby decreasing the voltage of the auxiliary capacitor, increasing the voltage of the bulk capacitor, decreasing the voltage of the series capacitor network and the internal primary voltage node, and decreasing the output voltage of the main converter.

During a line voltage half cycle the rectified line voltage has the shape of a positive half cycle of a sine wave. A conventional PFC controller circuit can be used to force the input current flowing into the main converter to follow the shape of the input voltage. During a half cycle the power delivered to the main converter from the input varies from zero power to twice the average power. When the input power is less than the average power then the bulk capacitor discharges and the auxiliary capacitor is charged to maintain the voltage of the internal primary voltage node and to maintain the output voltage. When the input power is greater than the average power then the bulk capacitor is charged and the auxiliary capacitor discharges to maintain the voltage of the internal primary voltage node and to maintain the output voltage. During a line half cycle the voltage of the internal primary voltage node changes little, but the voltage of the bulk capacitor will change significantly, typically on the order of 10% of its average dc voltage. The voltage of the auxiliary capacitor will have a dc voltage much less than the dc voltage of the bulk capacitor and its voltage will vary from a minimum value near zero volts (on the order of %% to 1% of the peak bulk capacitor voltage) to a maximum voltage on the order of 10% of the peak bulk capacitor voltage. At the maximum and minimum auxiliary capacitor voltages the power processed by the auxiliary converter is zero. The maximum power processed by the auxiliary converter corresponds to the average value of the auxiliary capacitor and will be on the order of 6% of the maximum load power. The average power processed by the auxiliary converter is on the order of 3% of the maximum load power. In a conventional single stage PFC converter the peak power processed by both primary and secondary circuits is twice the average load power. With the bi-directional auxiliary converter the peak power processed in the secondary circuits of the main converter of the subject invention is equal to the peak load power. By controlling the auxiliary capacitor voltage in the primary of the main converter the power variations in the primary circuit due to power factor correction are transparent to the secondary circuit.

Figure 11:
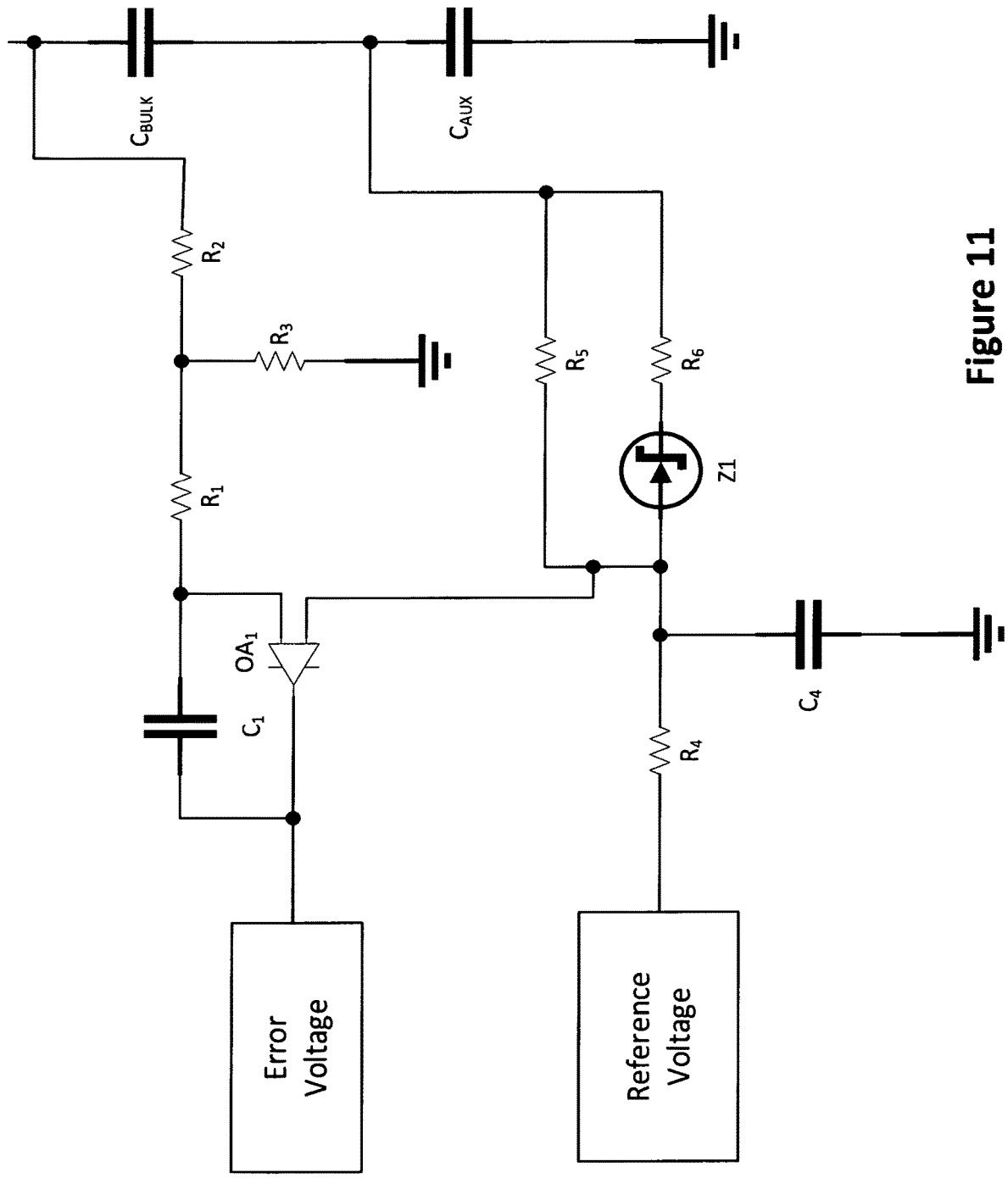
FIG. 11 illustrates a feedback voltage control circuit for the single stage PFC converter that minimizes processed power for use in the subject invention.

FIG. 11 illustrates an error voltage circuit that senses the voltage of the internal primary voltage node. The circuit also senses the voltage of the auxiliary capacitor. An increase in the voltage of the internal primary voltage node causes a decrease in the error voltage as a correction. The voltage of the auxiliary capacitor causes a small change to the reference voltage. The resistors $R_4$, $R_5$, and $R_6$ are set so that the auxiliary capacitor voltage will be a minimum and confined to a certain range. $R_6$ is much less than $R_4$. $R_5$ is much larger than $R_4$. If the zener diode $Z_1$ is in a conducting state either by being forward biased or by avalanching, the voltage applied to the non-inverting input of the operational amplifier, OA1, will be altered relatively quickly. The effect of $R_5$ is to increase the voltage at the non-inverting input of OA1, but very gradually. Increasing the voltage at the non-inverting input of OA1 has the effect of increasing the bulk capacitor voltage and decreasing the auxiliary capacitor voltage. If the auxiliary capacitor voltage falls more than a diode forward voltage below the reference voltage then $Z_1$ acting as a junction diode becomes forward biased and reduces the voltage at the non-inverting input of OA1 which has the effect of decreasing the bulk capacitor voltage and increasing the auxiliary capacitor voltage thereby setting a floor for the auxiliary capacitor voltage. A ceiling is set for the auxiliary capacitor voltage if the zener diode $Z_1$ avalanches, which results in quickly increasing the voltage at the non-inverting input of OA1. If the avalanche voltage is properly chosen, $Z_1$ will only avalanche if the auxiliary capacitor voltage rises above its normal operating range, which would only occur in an output overload condition. The overall effect of the FIG. 11 circuit is to maintain the proper voltage of the internal primary voltage node and the output voltage and simultaneously minimize the auxiliary capacitor voltage and minimize the power processed by the auxiliary converter.

Figure 4:
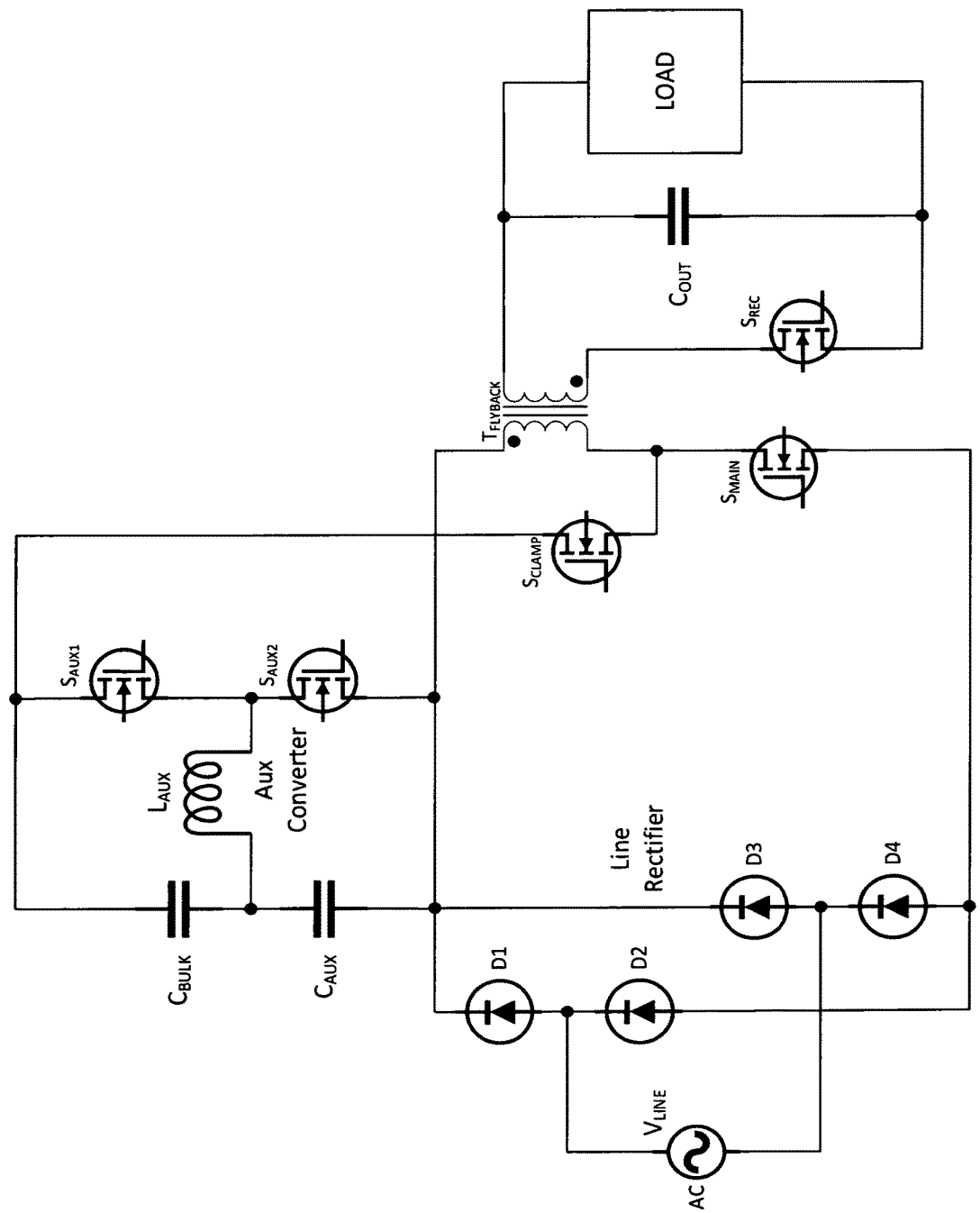
FIG. 4 illustrates a PFC power converter having reduced power processing with an active clamp flyback converter implementation of the single stage PFC converter according to the subject invention.

FIG. 4 illustrates an implementation of the main converter using an active clamp flyback converter. Operation of the active clamp flyback converter is described in U.S. Pat. No. 5,402,329. The leakage inductance of the transformer $T_1$ serves as the series inductance described in the '329 patent. The series capacitor network substitutes for the clamp capacitor. An auxiliary converter is shown for transferring energy to and from the auxiliary capacitor. During the off time of the main switch both the clamp switch $S_{CLAMP}$ and the secondary rectifier switch $S_{REC}$ conduct. The output voltage is roughly proportional to the voltage of the series capacitor network, the constant of proportionality being the turns ratio of the transformer, which couples the series capacitor network to the output. As indicated above the auxiliary converter senses the output voltage and adjusts the voltage of the auxiliary capacitor and the series capacitor network to regulate the output voltage. In the FIG. 4 circuit the load is regulated by action of the auxiliary converter and the power processed by the secondary circuit is equal to the load power. The average power processed by the primary circuit is equal to the load power but the peak power processed by the primary circuit is equal to twice the load power. In a typical single stage PFC converter the peak power in both the primary circuit and the secondary circuit is equal to the load power. The fact that the single stage PFC converter of the subject invention has a secondary stage with a peak power equal to half of the peak power of a typical single stage PFC converter gives the single stage PFC converter of the subject invention an efficiency and size advantage. The secondary switch of the subject invention enjoys the same advantage over the secondary switch of the prior art single stage PFC converter.

Figure 5:
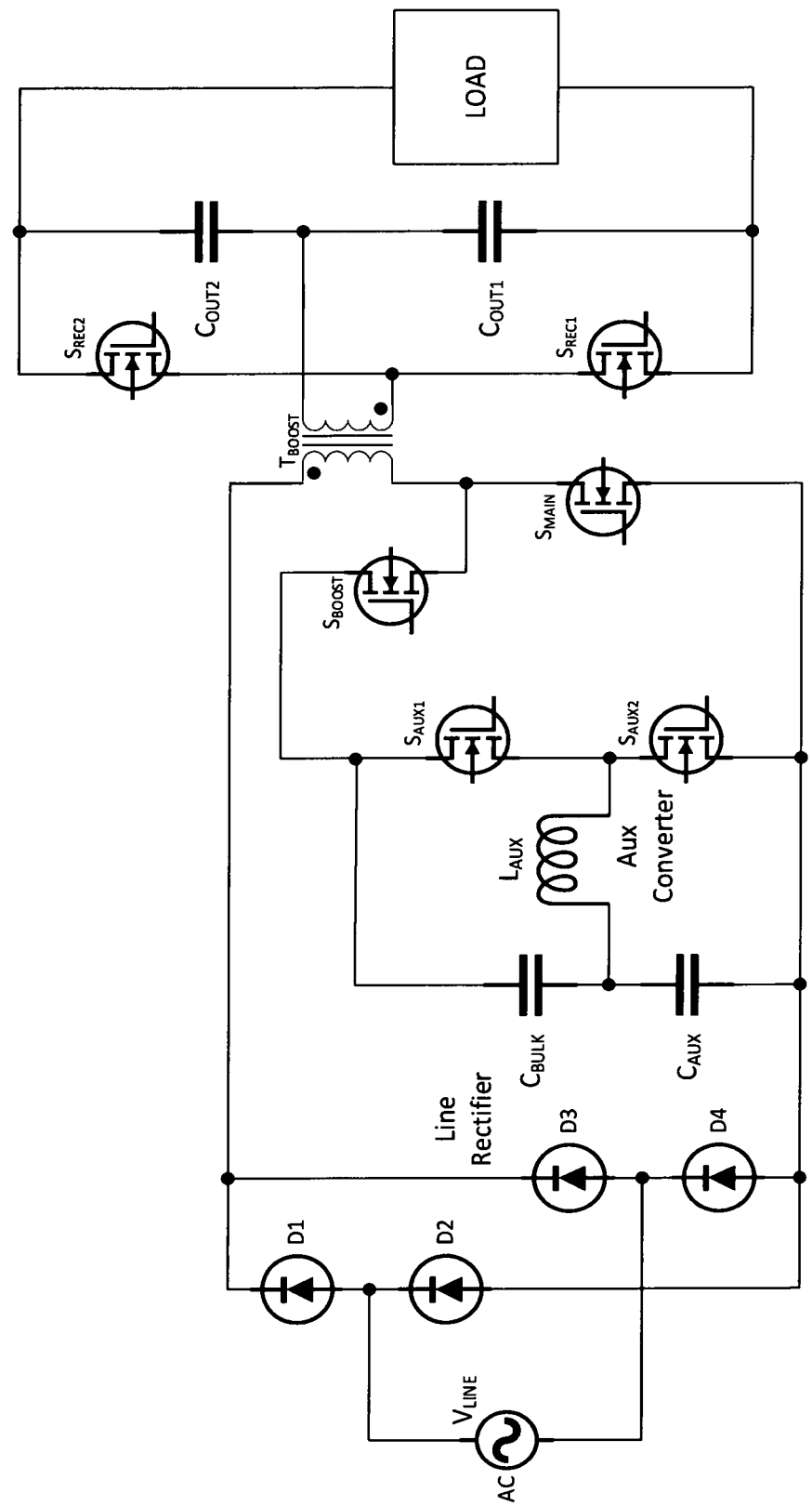
FIG. 5 illustrates a PFC power converter having reduced power processing with an active clamp coupled boost converter implementation of the single stage PFC converter according to the subject invention.

FIG. 5 illustrates an implementation of the subject invention using an active clamp coupled boost converter for the main converter. The operation of the active clamp coupled boost converter is described in U.S. Pat. No. 7,864,549. The main converter of FIG. 5 relies on transformer leakage inductance to provide some energy for zero voltage switching (ZVS). For most applications the coupled boost converter has an efficiency advantage over the flyback converter and the active clamp coupled boost converter has EMC advantages for all applications. The main converter of FIG. 5 may enable use of a higher bulk capacitor voltage with better energy storage density compared to the bulk capacitor of FIG. 4. The coupled boost converter requires two secondary switches which are effectively series connected, but the voltage stress of the two secondary switches is much less than the voltage stress of the flyback main converter of FIG. 4 so that the secondary switch conduction losses will likely be less for equal amounts of silicon, since on resistance varies approximately as the square of the voltage stress for MOSFET switches. The voltage stress of the switches in the coupled boost converter is equal to the load voltage, whereas the voltage stress on the secondary flyback switch may be several times the load voltage. Also, the voltage stress of the secondary winding in the flyback is much larger than the voltage stress on the secondary winding of the coupled boost so that fewer turns can be used in the coupled boost and much lower secondary winding resistance and much lower secondary winding conduction losses can be achieved.

Figure 6:
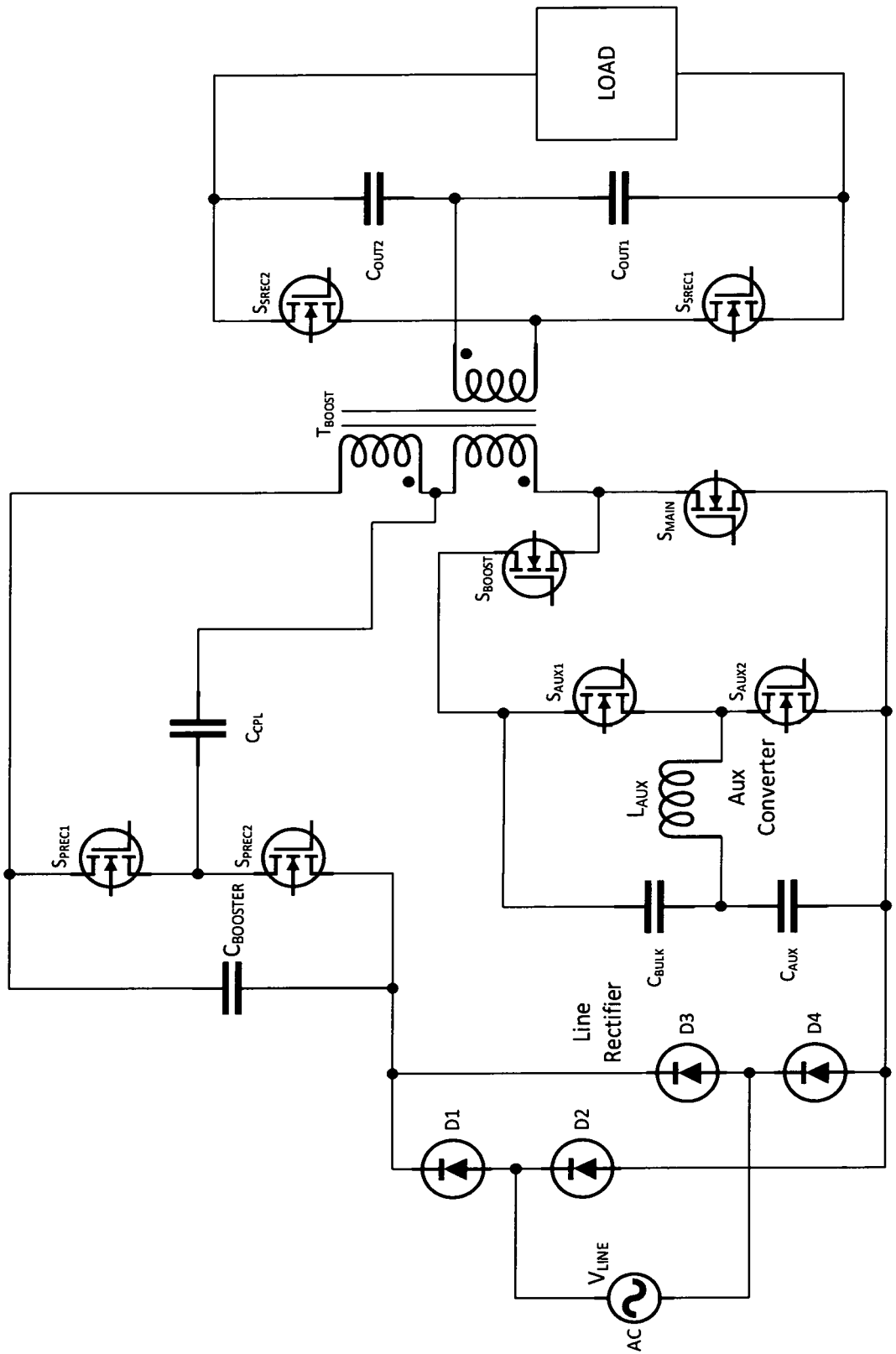
FIG. 6 illustrates a PFC power converter having reduced power processing with an active clamp coupled boost converter with line voltage booster implementation of the single stage PFC converter according to the subject invention.

FIG. 6 illustrates an implementation of the subject invention wherein an active clamp coupled boost converter with a line booster output is used as the main converter. The FIG. 6 circuit is identical to the FIG. 5 circuit with the addition a line booster output placed in series with the input. The line booster effectively allows for the reduction of the duty cycle range. The efficiency of the secondary circuit in a coupled inductor boost converter is a maximum at 50% duty cycle. The line booster enables the coupled boost converter to operate closer to 50% duty cycle over its entire range. Without the booster the duty cycle may have excursions very close to the duty cycle extremes. The addition of the booster reduces secondary circuit power losses but increases primary circuit power losses. In most cases the line booster will provide an overall efficiency advantage, but will add to the overall system cost. In the FIG. 6 circuit the line booster is powered from a tap in the primary winding. The number of primary turns required will increase to accommodate the increased line voltage due to the line booster, but the average winding current will be reduced. The section of the $T_{BOOST}$ primary winding that connects to $C_{BOOSTER}$ experiences lower current than the remainder of the primary winding since the currents that charge the booster capacitor cancel to some extent the current that flows in the section of the $T_1$ primary winding that connects to $S_{MAIN}$.

Figure 7:
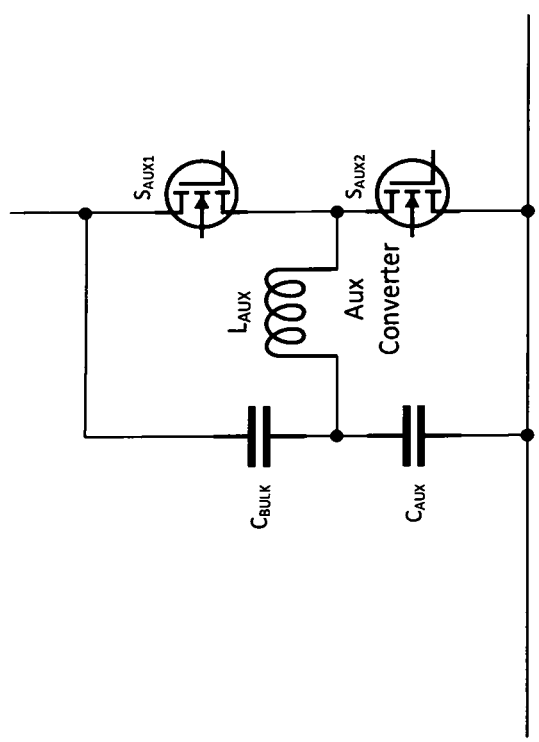
FIG. 7 illustrates a buck converter implementation of an auxiliary converter for use in a PFC power converter having reduced power processing according to the subject invention.

FIG. 7 illustrates a buck converter implementation of the auxiliary converter according to the subject invention. The FIG. 7 implementation is simple, but it is not the most efficient solution due to the high step down ratio of the buck converter. The FIG. 7 auxiliary converter is both a buck converter and a boost converter since half the time it transfers charge from the bulk capacitor to the auxiliary capacitor and half the time it transfers charge from the auxiliary capacitor to the bulk capacitor. In the FIG. 7 implementation both of the switches must be capable of bi-directional current flow so the switches cannot be diodes.

Figure 8:
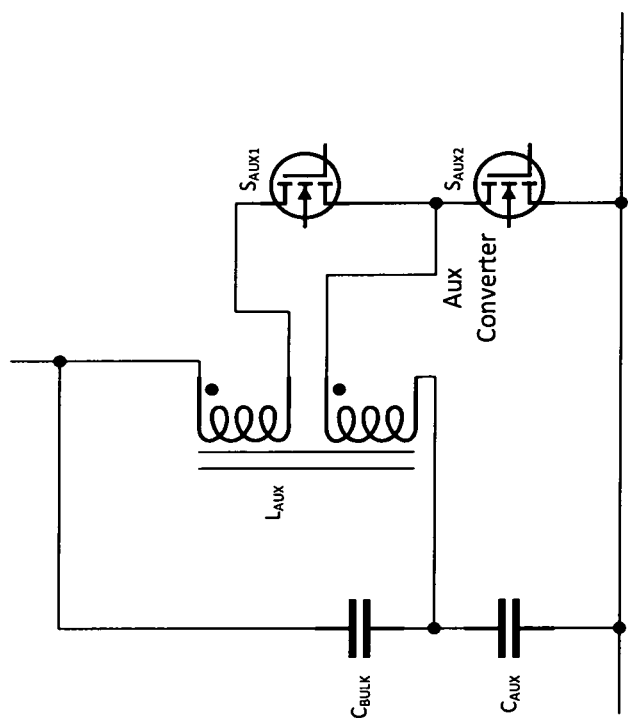
FIG. 8 illustrates a tapped inductor buck converter implementation of an auxiliary converter for use in a PFC power converter having reduced power processing according to the subject invention.

FIG. 8 illustrates a tapped inductor buck implementation of the auxiliary converter according to the subject invention. The tapped inductor buck converter is more efficient than a buck converter for high step down ratios. For step down ratios greater than about 4:1 the tapped inductor buck converter has the efficiency advantage. Since the auxiliary converter is a bi-directional power converter the auxiliary converter is also a tapped inductor boost converter. The switch voltage stress of the $S_{AUX1}$ switch is on the order of twice the voltage of the series capacitor network.

Figure 9:
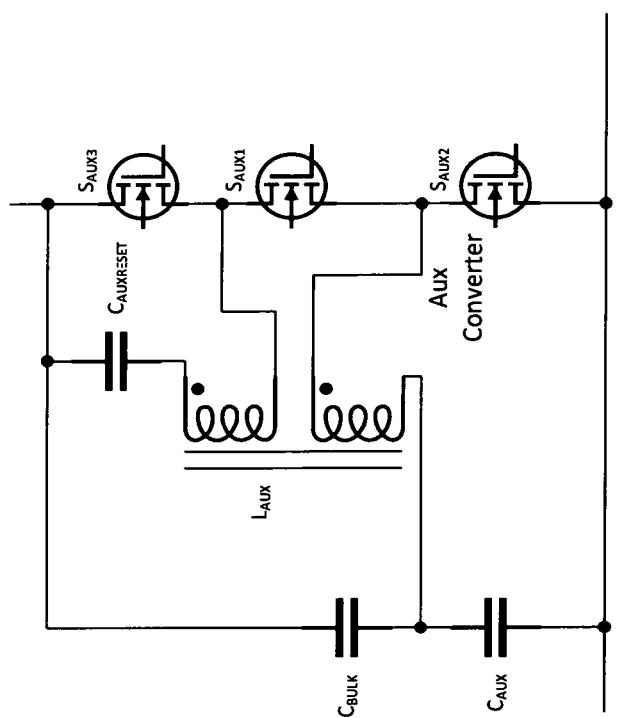
FIG. 9 illustrates a minimum voltage tapped inductor buck converter implementation of an auxiliary converter for use in a PFC power converter having reduced power processing according to the subject invention.

FIG. 9 illustrates a minimum voltage tapped inductor buck converter implementation of the auxiliary converter according to the subject invention. The minimum voltage tapped inductor converter has lower switch voltage stresses, but requires three switches. The switch voltage stress is limited to the voltage of the series capacitor network for the $S_{AUX1}$ switch. The other 2 switches have maximum stresses less than the voltage of the series capacitor network and the switch voltage stress of the $S_{AUX2}$ switch is much less than the voltage stress of the series capacitor network. Because of the lower switch voltage stresses the total conduction losses of the three switches of the FIG. 9 circuit will be lower than the conduction losses for the two switches of the FIG. 8 circuit for the same amount of total silicon in optimized circuits. Another advantage of the FIG. 9 circuit is that it can easily be made to have zero voltage switching relying on the reversal of magnetizing current and reversal of winding current which reverses the energy stored in the leakage inductance positioning that energy to drive a zero voltage transition, as explained in U.S. Pat. No. 7,480,156. Also, the winding voltage stresses are lower in the FIG. 9 circuit so the windings require fewer turns and will have lower winding resistance and lower conduction losses in comparison to the FIG. 8 circuit.

Figure 10:
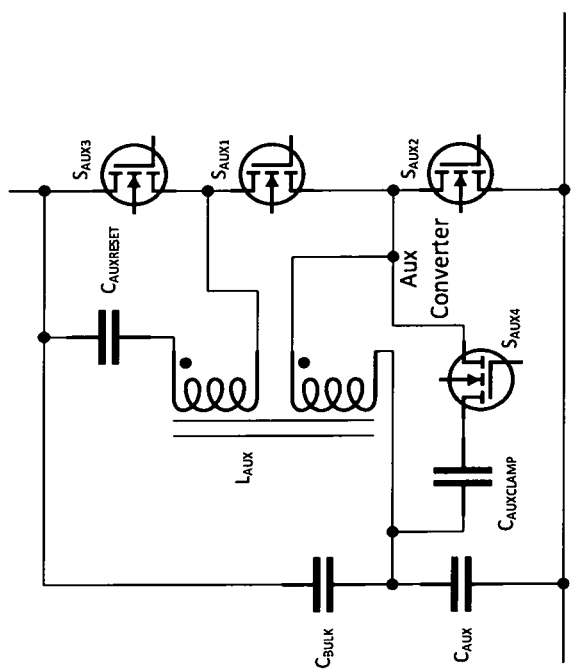
FIG. 10 illustrates an active clamp minimum voltage tapped inductor buck converter implementation of an auxiliary converter for use in a PFC power converter having reduced power processing according to the subject invention.

FIG. 10 illustrates a minimum voltage tapped inductor buck converter with active clamp implementation of the auxiliary converter according to the subject invention. The FIG. 10 circuit adds another switch, $S_{AUX4}$, and a clamp capacitor, $C_{AUXCLAMP}$, for clamping leakage inductance energy during the on time of the $S_{AUX1}$ switch. The $S_{AUX4}$ switch has zero average current and relatively low voltage stress so that it can be a relatively small switch. With the active clamp there can be no leakage inductance induced ringing.

Conclusion, Ramifications, and Scope of Invention

Thus the reader will see that in some single stage PFC converters there is a primary voltage node whose voltage with respect to an input terminal proportionally affects the output voltage of the single stage PFC converter. Also, by adding a series combination of a bulk capacitor and an auxiliary capacitor between the above referred to primary voltage node and the above referred to input terminal and by controlling the voltage of the auxiliary capacitor and the series combination of capacitors using a bi-directional auxiliary power converter powered from the bulk capacitor the output voltage of the single stage PFC can be tightly regulated with the benefit of having the total power processed by the combination of the single stage PFC converter and the bi-directional auxiliary power converter be much less than the total power processed by any other scheme for accomplishing tightly regulated output voltage in a PFC converter.

While my above description contains many specificities, these should not be construed as limitations on the scope of the invention, but rather, as exemplifications or preferred embodiments thereof. Many other variations are possible. For example, circuits similar to those illustrated but with switches implemented with power transistors should be considered embodiments of the subject invention. Circuits similar to those illustrated but with secondary switches and booster circuit switches implemented with diode rectifiers and power transistors should be considered embodiments of the subject invention. Circuits with multiple secondaries, although not illustrated, should be considered embodiments of the subject invention. Circuits with multiple series or parallel connected main converters that share a smaller or larger number of series or parallel connected auxiliary converters, although not illustrated, shall be considered embodiments of the subject invention. In many of the circuits shown there are series connected networks. The order of placement of circuit elements in series connected networks is inconsequential in the illustrations shown so that series networks in the illustrated circuits with circuit elements reversed or placed in an entirely different order within series connected networks are equivalent to the circuits illustrated and shall be considered embodiments of the subject invention. In the illustrations flyback and coupled boost converters were shown as examples of singles stage PFC circuits having the necessary properties for application of the subject invention. Other types of single stage PFC circuits can also be used in the subject invention and these too shall be considered embodiments of the subject invention. For example an active clamp isolated Cuk converter may be a candidate for application as a single stage PFC converter in the subject invention and should be considered an embodiment of the subject invention. Other types of bi-directional auxiliary converters can also be used in the subject invention and these too shall be considered embodiments of the subject invention. For example a bi-directional SEPIC converter or bi-directional active clamp tapped inductor buck converter can be used as the bi-directional auxiliary converter.

Accordingly, the scope of the invention should be determined not by the embodiments illustrated, but by the appended claims and their legal equivalents.

What is claimed is:

1. A power factor corrected converter comprising,
line input, having a first terminal and a second terminal, coupleable to a rectified source of ac power,
secondary load output, having a first terminal and a second terminal, coupleable to a load,
a first output capacitor, having a first terminal and a second terminal, with said first terminal of said first output capacitor connected to said first terminal of said secondary load output and with said second terminal of said first output capacitor connected to said second terminal of said secondary load output,
a first primary dc voltage node connected to a terminal of said line input,
a second primary dc voltage node,
a series capacitor network comprising a series combination of, an auxiliary capacitor having a first terminal and a second terminal with said first terminal of said auxiliary capacitor connected to said first primary dc voltage node, a bulk energy storage capacitor having a first terminal and a second terminal with said first terminal of said bulk energy storage capacitor connected to said second terminal of said auxiliary capacitor and said second terminal of said bulk energy storage capacitor connected to said second primary dc voltage node, wherein a voltage of said series capacitor network is approximately proportional to a voltage difference between said terminals of said secondary load output, a first power subconverter having a first primary terminal, a second primary terminal, a first secondary terminal, and a second secondary terminal, with said first primary terminal connected to a terminal of said line input input of said power factor corrected converter, said second primary terminal connected to said second primary dc voltage node, a first secondary terminal connected to a first terminal of said secondary load output, and said second secondary terminal connected to said second terminal of said secondary load output, and a second power subconverter having bi-directional power conversion capability and having a first terminal, a second terminal, and a third terminal with said first terminal of said second power converter connected to said first dc voltage node, said second terminal of said second power subconverter connected to said second dc voltage node, and said third terminal of said second power converter connected to said first terminal of said bulk energy storage capacitor for exchanging energy between said bulk energy storage capacitor and said first auxiliary capacitor to control a voltage difference between said first primary dc voltage node and said second primary dc voltage node, whereby said second power subconverter is responsive to a voltage difference between said terminals of said secondary load output and processes less than fifty percent of a maximum power flowing to said secondary load output, said first power subconverter is responsive to a voltage difference between said terminals of said line input to control a current flowing from said line input to achieve power factor correction, and said power factor corrected converter achieves higher efficiency than a two stage power factor corrected converter that processes twice all of said power flowing to said secondary load output.

2. The power factor corrected converter as set forth in claim 1 wherein said first power subconverter is either an active clamp coupled inductor boost converter or an active clamp flyback converter.

3. The power factor corrected converter of claim 1 wherein said second power subconverter is a bi-directional tapped inductor converter, a bi-directional flyback converter, or a bi-directional buck converter.

4. The power factor corrected converter as set forth in claim 1 wherein said second power subconverter is responsive to an output voltage.

5. The power factor corrected converter as set forth in claim 1 wherein said second power subconverter is responsive to an output current.

6. The power factor corrected converter as set forth in claim 1 further comprising a control circuit, responsive to a load power flowing to said secondary load output, that automatically reduces a percentage of power processed by said second power subconverter as said load power decreases and increases said percentage of load power processed by said second power subconverter as said load power increases.

7. The power factor corrected converter as set forth in claim 1 wherein said first power subconverter further comprises a line voltage booster network connected in series with said line input, wherein said line voltage booster network enables power transfer from said bulk storage capacitor to said secondary load output when a voltage of said line input is zero.

8. The power factor corrected converter as set forth in claim 1 wherein said second primary dc voltage node is a terminal of said line input.

* * * * *